A. J. LAVOIE.
CLUTCH AND BRAKE MECHANISM.
APPLICATION FILED AUG. 14, 1919.
1,395,840.
Patented Nov. 1, 1921.
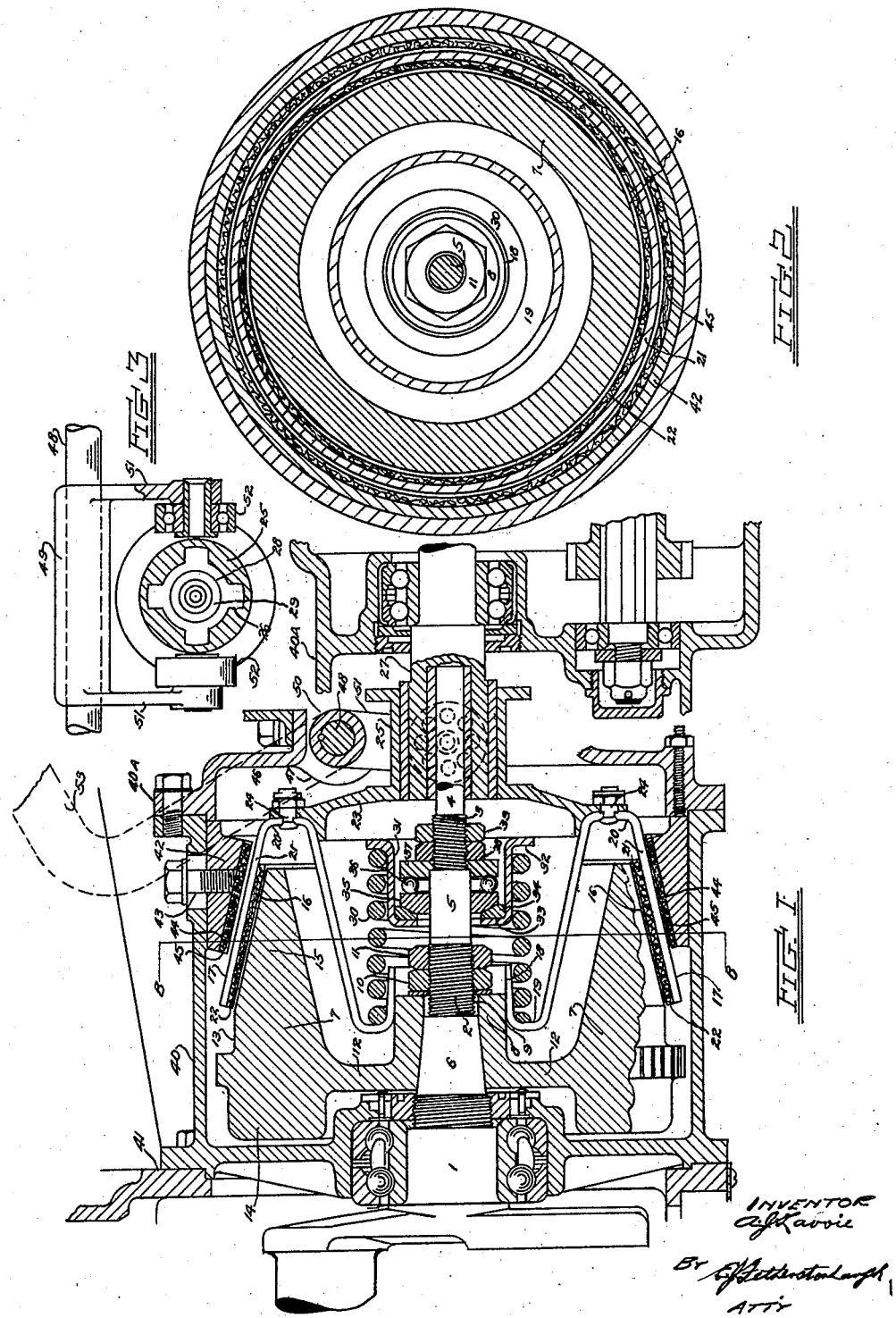

UNITED STATES PATENT OFFICE.

ALPHONSE JOSEPH LAVOIE, OF MONTREAL, QUEBEC, CANADA.

CLUTCH AND BRAKE MECHANISM.

1,395,840.  Specification of Letters Patent.  Patented Nov. 1, 1921.

Application filed August 14, 1919. Serial No. 317,627.

*To all whom it may concern:*

Be it known that I, ALPHONSE JOSEPH LAVOIE, a subject of the King of Great Britain, and residing at 294 Wilson avenue, in the city and District of Montreal, in the Province of Quebec, in the Dominion of Canada, have invented a new and useful Clutch and Brake Mechanism, of which the following is the specification.
The invention relates to clutch and brake mechanism as described in the present specification and illustrated in the accompanying drawings that form part of the same.

The invention consists essentially of the novel construction and arrangement of parts, whereby the continuous operation of the clutch lever in one direction effects the braking for coasting or stopping the vehicle.

The objects of the invention are to eliminate the necessity of operating a brake mechanism; to facilitate the control of a vehicle in crowded thoroughfares and dangerous roads; to minimize the liabilities to accidents due to lack of presence of mind under stress of circumstances; to diminish the strain on the motor by reason of the intimate relations of the braking mechanism to the motor movement; to devise a clutch and brake mechanism applicable to both light and heavy equipments; and generally to provide a simple, cheap, durable and efficient clutch and brake for motor vehicles and such other places as it may with economy and serviceability be applied.
In the drawings, Figure 1 is a longitudinal sectional view of the clutch and brake mechanism, showing a gear transmission of the selective type broken away.

Fig. 2 is a cross sectional view on the line B—B in Fig. 1.

Fig. 3 is a sectional view, showing end of gear shaft in spider sleeve.

Like numerals of reference indicate corresponding parts in each figure.
Referring to the drawings, the numeral 1 indicates the crank shaft, which is here shown as threaded at 2 and 3 intermediate of its length and as having the reduced end portion 4, the middle portion 5 between the threads 2 and 3 and the tapered portion 6 meeting the main crank portion and carrying the fly wheel 7.

The hub 8 of the fly wheel 7 is mounted on the taper 6. The nut 10 and lock nut 11 securely hold the fly wheel 7 in its place.

From the hub 8 the web 12 extends to the wheel rim 13, which projects inwardly on the inner side 14 for balance purposes and outwardly in a long projection 15 of tapered shape in cross section forming the annular clutch surface 16 on the outer side, or if preferred on the inner side or it may be applied to a driving member other than the fly wheel.

The clutch 17 is of substantially cup or bowl shape, having the central opening at the bottom of the cup with the inturned end 18 mounted on the hub 8, thereby forming an annular spring recess 19. The outer end of the cup is crossed over the extremities of the projection 15 of the fly wheel at 20, and continues in the clutch extension 21 on the inner surface of which suitable gripping material 22 is mounted to engage the surface 16 in clutching operations.

The clutch spider 23 is rigidly secured to the cup ends 20 by the bolts 24 and extends slightly into the cup and thereacross to the sleeve 25, which is flanged at its outer end. The sleeve 25 has longitudinal slots 26 and the gear shaft 27 of a selective type of gear transmission shaped correspondingly is inserted in the sleeve 25 and slots 26. The gear shaft 27 is bored at its enlarged end portion and the bore 28 contains the bushing 29, into which the reduced end 4 of the crank shaft extends.

The helical spring 30 is introduced into the spring recess 19 and therefore encircles the crank shaft 1 and extends outwardly and terminates adjacent to the spider 23.

The keeper 31 for the spring also encircles the crank shaft 1 and at its outer end has the annular flange 32 engaging the outer end of the spring 30 against the spring pressure exerted by the clutch 17. The inner end of the keeper is flanged inwardly at 33 and engages the ring 34 beveled on its outer side and engages the rotatable disk 35 turning on the balls 36 against the fixed disk 37 screw-threaded on the crank shaft at 3 and held by the nut 38 and lock nut 39.

It will be thus seen that the spring 30 is constantly pressed inwardly by the keeper 31, therefore the tendency is to always keep the clutch 17 in engagement with the fly wheel or other driving member.

The brake ring casing 40 is securely bolted to the engine frame 41 or other suitable place and toward the outer end of this casing the brake ring 42 is securely attached by the screws 43. The brake ring 42 has a beveled surface 44 on which is mounted suitable gripping material 45 to meet the back of the clutch extension 21 when drawn into engagement.

The wall 46 of the gear casing 40ª is formed with brackets 47, in which the fixed shaft 48 is mounted.

The brake lever 49 is mounted at its sleeve end 50 on the shaft 58 and its forked end 51 straddles the spider sleeve 25, said forked end being formed with the ball bearing rings 52 coming into engagement with the flange of said sleeve 25 during the rotation of the latter in braking operations.

The pedal crank 53 is rigidly secured to the sleeve 50, so that on pressing the pedal of said crank 53 the spider is drawn outwardly and the brake applied.

In the operation of this invention, the normal state of the clutch is in engagement with the fly wheel or other driving member in consequence of the pressure of the spring held in that state by the keeper secured to the crank shaft.

It will thus be seen that the spider rotates with the fly wheel and as the sleeve from the spider is connected with the gear shaft, the latter will be rotated coincidently with the rotation of the crank shaft.

The advance, neutral and reverse positions, so far as the driving of the vehicle or other machine is concerned is obtained through the selective gear transmission, which otherwise has nothing to do with this invention.

Supposing for the better understanding of the invention, that the advance position has been selected, then the machine will be connected to the motor and will travel accordingly and presuming that it is desirable to check the speed, the pedal is pressed by the foot of the driver and the clutch lever swings and comes into contact with the flange of the spider sleeve and this draws the clutch away from the fly wheel and the back of the clutch extensions into contact with the brake ring, thus a coasting speed may be readily obtained for going down hill and if it is desirable to stop the machine entirely, then a firmer and harder pressure on the pedal is necessary, which results in a closer rubbing effect on the brake and the consequent cessation of rotation of the gear shaft, as any movement or stoppage or slowing of the spider will always be at once communicated to the gear shaft.

It must be explained that this invention is intended for a "service" brake, as there are devices for braking in changing speed, which may very distantly resemble this in some of its broad features and therefore it is well to avoid confusion in the first place and look at this as the regular brake of the machine or vehicle. Further it may be noted that the braking power in this invention is increased by the reduction of gears in the transmission, so in coasting it is advisable to change gears for the heavier service and thereby obtain greater power in retarding the speed of the machine.

Various changes may be made in the details of the construction without departing from the spirit of the invention, and so long as such changes are within the claims for novelty following the protection accorded shall not be invalidated.

What I claim is:—

1. In a gasolene engine, a clutch and brake mechanism comprising an engine shaft and a flywheel mounted thereon, and extending from its hub in projections, walling in an annular spring recess and forming clutch surfaces, a transmission shaft, a cupped brake and clutch member encircling said hub and spring-held to its engagement and fixedly supported from said transmission shaft and forming a receptacle for said projection between the clutch and brake shoe portion and recess wall, a brake ring encircling the brake shoe portion and means for operating said brake and clutch member.

2. In a gasolene engine, a clutch and brake mechanism in which a clutch member is fixedly supported from a transmission shaft in alinement with the engine shaft, and is recessed centrally for a spring and annularly for the flywheel clutch extension, forming on the inside a driving clutch and on the outside a brake clutch, a flywheel having a hub forming a mounting for said clutch member, and a driving clutch projection, a spring between a keeper on the engine shaft and the bed of said central recess, a brake ring fixedly secured and having a brake surface parallel with said brake clutch and means for operating said clutch member.

3. In clutch and brake mechanism, a transmission shaft, an engine shaft in concentric axial arrangement with said transmission shaft, a driving member mounted on said engine shaft, a clutch member concentric with said driving member and said engine shaft, and mounted on said transmission shaft and normally in engagement with said driving member, a brake member concentric with said driving member, said clutch member, said transmission shaft, and said engine shaft, and surrounding the clutch member, and means for releasing the latter and immediately following said release for applying the clutch to the brake member.

Signed at the city of Montreal, Quebec, Canada, this 1st day of August, 1919.

ALPHONSE JOSEPH LAVOIE.